(12) United States Patent
Liu

(10) Patent No.: US 9,848,643 B2
(45) Date of Patent: Dec. 26, 2017

(54) ELECTRONIC CIGARETTE

(71) Applicant: Qiuming Liu, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 60 days.

(21) Appl. No.: 14/119,083

(22) PCT Filed: Sep. 3, 2013

(86) PCT No.: PCT/CN2013/082848
§ 371 (c)(1),
(2) Date: Nov. 20, 2013

(87) PCT Pub. No.: WO2015/021678
PCT Pub. Date: Feb. 19, 2015

(65) Prior Publication Data
US 2016/0242463 A1    Aug. 25, 2016

(30) Foreign Application Priority Data
Aug. 15, 2013 (CN) .................... 2013 2 0499843 U

(51) Int. Cl.
*A24F 47/00* (2006.01)
*H01M 2/10* (2006.01)

(52) U.S. Cl.
CPC .......... *A24F 47/002* (2013.01); *A24F 47/008* (2013.01); *H01M 2/1055* (2013.01); *H01M 2220/30* (2013.01)

(58) Field of Classification Search
CPC .................................................. A24F 47/008
See application file for complete search history.

(56) References Cited

U.S. PATENT DOCUMENTS

2012/0285475 A1* 11/2012 Liu ..................... A24F 47/008
                                                                    131/329
2013/0192615 A1* 8/2013 Tucker ................. H01C 17/00
                                                                    131/328

(Continued)

FOREIGN PATENT DOCUMENTS

CN         2631238 Y    8/2004
CN   WO 2011124033 A1 * 10/2011 ........... A24F 47/008

(Continued)

*Primary Examiner* — Eric Yaary
(74) *Attorney, Agent, or Firm* — Yue Xu; U.S. Fairsky LLP

(57) ABSTRACT

An electronic cigarette, in which an atomizer assembly protective cartridge is provided outside of the atomizer assembly, and a battery assembly protective cartridge is provided outside of the battery assembly. An atomizing seat fitted with the holder is provided at an inner end of the atomizer assembly. At least a coating layer is provided outside of the atomizer assembly protective cartridge, the holder and the battery assembly protective cartridge, and enables connection between the atomizer assembly protective cartridge, the holder and the battery assembly protective cartridge. In the overall process of assembling the electronic cigarette, since there is no pushing or squeezing action between the atomizer assembly and the battery assembly, it is possible to effectively avoid oil leakage caused by an inclination and a deformation of the atomizing seat under uneven force is effectively avoided.

7 Claims, 1 Drawing Sheet

(56) References Cited

U.S. PATENT DOCUMENTS

| | | | | |
|---|---|---|---|---|
| 2013/0247924 A1* | 9/2013 | Scatterday | ............ | A61M 15/06 131/329 |
| 2014/0130817 A1* | 5/2014 | Li | ........................ | A24F 47/008 131/329 |
| 2014/0261489 A1* | 9/2014 | Cadieux | ................ | A24F 47/008 131/328 |
| 2014/0366895 A1* | 12/2014 | Li | ....................... | H01M 2/1055 131/329 |
| 2015/0020825 A1* | 1/2015 | Galloway | ................ | G08B 6/00 131/329 |

FOREIGN PATENT DOCUMENTS

| | | |
|---|---|---|
| CN | 202262413 U | 6/2012 |
| CN | 203087527 U | 7/2013 |
| JP | 3164408 U | 11/2010 |

\* cited by examiner

ELECTRONIC CIGARETTE

This application is the U.S. national phase of International Application No. PCT/CN2013/082848 filed on Sep. 3, 2013, which claims the benefit of priority to Chinese patent application No. 201320499843.1 titled "ELECTRONIC CIGARETTE" and filed with the Chinese State Intellectual Property Office on Aug. 15, 2013, the entire disclosure of which is incorporated herein by reference.

FIELD OF THE INVENTION

The present application relates to the technical field of the emulation equipment of the cigarette, and particularly to an electronic cigarette.

BACKGROUND OF THE INVENTION

The electronic cigarette is a common electronic emulation product of cigarette. With ever increasing requirements of usage, users impose a higher requirement on the performance of the electronic cigarette.

In the current conventional electronic cigarette, an atomizer assembly and a battery assembly are generally assembled in a same protective cartridge. In the process of assembling, in general, the atomizer assembly is placed in the protective cartridge firstly, and then is pushed in place within the protective cartridge by the battery assembly. However, in the above process of assembling, an atomizing seat is apt to be inclined and deformed under the action of the battery assembly pushing the atomizer assembly, thereby resulting in oil leakage and then an adverse effect on the normal use of the electronic cigarette and the customer's experience.

Thus, an important technical problem to be solved presently by those skilled in the art is to enhance the assembling reliability of the electronic cigarette and avoid the oil leakage thereof

SUMMARY OF THE INVENTION

An object of the present application is to provide an electronic cigarette, which has a high assembling reliability and does not easily cause oil leakage.

In order to solve the above problem, there is provided in the present application an electronic cigarette, including an atomizer assembly and a battery assembly cooperated with each other, wherein an atomizer assembly protective cartridge is provided outside of the atomizer assembly, a battery assembly protective cartridge is provided outside of the battery assembly, the atomizer assembly protective cartridge is connected to the battery assembly protective cartridge via a holder, an atomizing seat fitted with the holder is provided at an inner end of the atomizer assembly;

and wherein at least a coating layer is provided outside of the atomizer assembly protective cartridge, the holder and the battery assembly protective cartridge, and enables connection between the atomizer assembly protective cartridge, the holder and the battery assembly protective cartridge.

Preferably, an air intake communicating with external environment is provided in the holder.

Preferably, a first air hole communicating with the air intake is provided in the battery assembly protective cartridge; and a second air hole communicating with the air intake is provided in the coating layer.

Preferably, an air inlet communicating with external environment is provided in an outer end of the battery assembly protective cartridge.

Preferably, the end of the holder fitted with the atomizing seat is provided with an inner plug-in section, and the end of the atomizing seat fitted with the holder is provided with an outer socket section, the holder being fixed to the atomizing seat by inserting the inner plug-in section into the outer socket section.

Preferably, the coating layer is a paster.

Compared with the above background technique, the electronic cigarette according to the present application includes an atomizer assembly and a battery assembly cooperated with each other, wherein an atomizer assembly protective cartridge is provided outside of the atomizer assembly, a battery assembly protective cartridge is provided outside of the battery assembly, the atomizer assembly protective cartridge is connected to the battery assembly protective cartridge via a holder, an atomizing seat fitted with the holder is provided at an inner end of the atomizer assembly; at least a coating layer is provided outside of the atomizer assembly protective cartridge, the holder and the battery assembly protective cartridge; and enables the connection between the atomizer assembly protective cartridge, the holder and the battery assembly protective cartridge. In operation, the atomizer assembly is mounted in the atomizer assembly protective cartridge, and the battery assembly is mounted in the battery assembly protective cartridge, and then the atomizer assembly protective cartridge is connected to the battery assembly protective cartridge by the holder and the coating layer, so as to finish assembling. In the overall process of assembling, since there is no pushing or squeezing action between the atomizer assembly and the battery assembly, it is possible to effectively avoid oil leakage caused by an inclination and a deformation of the atomizing seat under uneven force is effectively avoided, and overall assembly structure of the electronic cigarette is stable and reliable.

BRIEF DESCRIPTION OF THE DRAWINGS

In order to clearly illustrate embodiments of the present application or technical solutions in the prior art, drawings required for the description of the embodiments or the prior art will be briefly introduced below. Apparently, the drawings described below simply refer to some embodiments of the present application, and those skilled in the art may obtain other drawings, based on the following drawings, without any creative work

DETAILED DESCRIPTION

An object of the present application is to provide an electronic cigarette, which has a high assembling reliability and is not apt to cause oil leakage.

In order that those skilled in the art can better understand technical solutions according to the present application, the present application will be explained in detail in conjunction with the accompanying drawings and the embodiments below.

Figure 1:
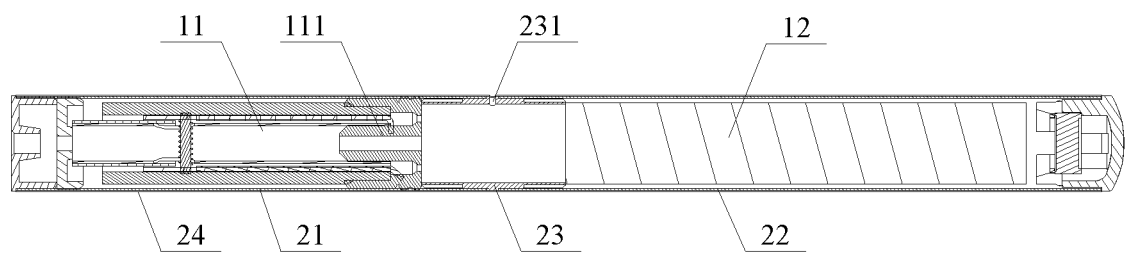
FIG. 1 is an assembly structural schematic view illustrating a structure of an electronic cigarette according to an embodiment of the present application.

Referring to FIG. 1, it is an assembly structural schematic view illustrating a structure of an electronic cigarette according to an embodiment of the present application;

In an embodiment, an electronic cigarette according to the present application includes an atomizer assembly 11 and a battery assembly 12 cooperated with each other. An atomizer assembly protective cartridge 21 is provided outside of the atomizer assembly 11, and a battery assembly protective cartridge 22 is provided outside of the battery assembly 12. The atomizer assembly protective cartridge 21 is connected to the battery assembly protective cartridge 22 via a holder 23. An atomizing seat 111 fitted with the holder 23 is provided at an inner end of the atomizer assembly 11. At least a coating layer 24 is provided outside of the atomizer assembly protective cartridge 21, the holder 23 and the battery assembly protective cartridge 22; and enables the connection of the atomizer assembly protective cartridge 21, the holder 23 and the battery assembly protective cartridge 22. In operation, the atomizer assembly 11 is mounted in the atomizer assembly protective cartridge 21, and the battery assembly 12 is mounted in the battery assembly protective cartridge 22, and then the atomizer assembly protective cartridge 21 is connected to the battery assembly protective cartridge 22 by the holder 23 and the coating layer 24, so as to finish assembling. In the overall process of assembling, since there is no pushing or squeezing action between the atomizer assembly and the battery assembly, it is possible to effectively avoid oil leakage caused by an inclination and a deformation of the atomizing seat under uneven force is effectively avoided, and overall assembly structure of the electronic cigarette is stable and reliable.

Further, there is the interference fit between the holder 23 and the atomizer assembly protective cartridge 21 as well as the battery assembly protective cartridge 22. Such interference fit could significantly enhance reliability and stability of the assembly structure between the holder 23 and the atomizer assembly protective cartridge 21 as well as the battery assembly protective cartridge 22, thereby enabling the overall structure of the electronic cigarette to be firmer and more stable.

Specifically, an air intake 231 communicating with external environment is provided in the holder 23. In use of the electronic cigarette, outside air is sucked in through the air intake 231 to maintain a normal working process of the electronic cigarette.

More specifically, a first air hole (not shown) communicating with the air intake 231 is provided in the battery assembly protective cartridge 22 or the atomizer assembly protective cartridge 21; and a second air hole (not shown) communicating with the air intake 231 is provided in the coating layer 24. The first air hole and the second air hole could communicate with the air intake 231 one another, thereby having an intake process of the electronic cigarette smoother.

On the other hand, an air inlet (not shown) communicating with external environment is provided in an outer end of the battery assembly protective cartridge 22. Since the air inlet is provided in the outer end of the battery assembly protective cartridge 22, i.e. the end, far away from a suction nozzle, of the overall structure of the electronic cigarette, it is possible to enhance an emulation effect of the electronic cigarette while ensuring an air intake process of the electronic cigarette, thereby improving the user's experiences accordingly.

Figure 2:
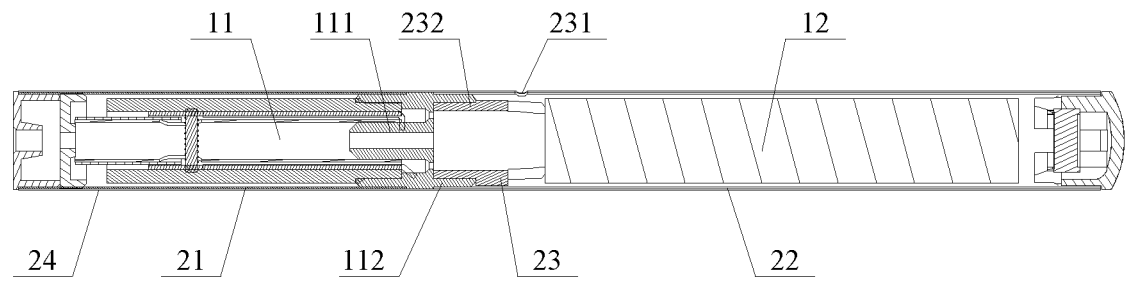
FIG. 2 is an assembly structural schematic view illustrating another structure of the electronic cigarette according to an embodiment of the present application.

Referring to FIG. 2, it is an assembly structural schematic view illustrating another structure of the electronic cigarette according to an embodiment of the present application.

On the other hand, the end of the holder 23 fitted with the atomizing seat 111 is provided with an inner plug-in section 232, and the end of the atomizing seat 111 fitted with the holder 23 is provided with an outer socket section 112. The holder 23 is fixed to the atomizing seat 111 by inserting the inner plug-in section 232 into the outer socket section 112. Such plug-socket mounting structure formed by a fit between the inner plug-in section 232 and the outer socket section 112 could effectively enhance stability and reliability of the assembly structure between the holder 23 and the atomizing seat 111, and have the assembly structure between the holder 23 and the atomizing seat 111 and the entire assembly structure of the electronic cigarette more stable and reliable.

Furthermore, the atomizer assembly protective cartridge 21 and the battery assembly protective cartridge 22 may be made of any one of the following materials: silicone, rubber, thermoplastic polyurethane (abbreviated as TPU hereinafter), thermoplastic elastomer (abbreviated as TPE hereinafter), thermoplastic rubber (abbreviated as TPR hereinafter), amorphous polyethylene terephthalate (abbreviated as APET hereinafter), polyvinyl chloride (abbreviated as PVC hereinafter), or polycarbonate (abbreviated as PC hereinafter). Such soft materials mentioned above may further optimize the protective effect of the atomizer assembly protective cartridge 21 on the atomizer assembly and the protective effect of the battery assembly protective cartridge 22 on the battery assembly, and improve the feeling of the user in using the electronic cigarette.

Further, the holder 23 may be made of any one of the following materials: silicone, rubber, TPU, TPE, TPR, APET, PVC, or PC. The material of the atomizer assembly protective cartridge 21, the battery assembly protective cartridge 22 and the holder 23 is not limited those listed, as long as it may meet the actual usage requirements of the electronic cigarette.

Furthermore, the coating layer 24 may be a paster. The paster has a low purchase cost, and is available largely on the market, and achieves better pasting and fixing effect, thereby meeting assembling requirements of the electronic cigarette while cutting down production costs thereof effectively.

In summary, the electronic cigarette according to the present application includes an atomizer assembly and a battery assembly cooperated with each other, wherein an atomizer assembly protective cartridge is provided outside of the atomizer assembly, a battery assembly protective cartridge is provided outside of the battery assembly, the atomizer assembly protective cartridge is connected to the battery assembly protective cartridge via a holder, an atomizing seat fitted with the holder is provided at an inner end of the atomizer assembly; at least a coating layer is provided outside of the atomizer assembly protective cartridge, the holder and the battery assembly protective cartridge; and enables the connection between the atomizer assembly protective cartridge, the holder and the battery assembly protective cartridge. In operation, the atomizer assembly is mounted in the atomizer assembly protective cartridge, and the battery assembly is mounted in the battery assembly protective cartridge, and then the atomizer assembly protective cartridge is connected to the battery assembly protective cartridge by the holder and the coating layer, so as to finish assembling. In the overall process of assembling, since there is no pushing or squeezing action between the atomizer assembly and the battery assembly, it is possible to effectively avoid oil leakage caused by an inclination and a deformation of the atomizing seat under uneven force is effectively avoided, and overall assembly structure of the electronic cigarette is stable and reliable.

The electronic cigarette according to the present application has been described above in detail. Specific examples are used herein to describe the principle and implementation of the present application, and the description of the above embodiments is only for purpose of better understanding the method and spirit of the present application. It should be noted that, various improvements and modifications may be made by those skilled in the art without departing from the principle of the present application, and these improvements and modifications also fall within the protection scopes of the claims.

What is claimed is:

1. An electronic cigarette, comprising an atomizer assembly and a battery assembly cooperated with each other, wherein an atomizer assembly protective cartridge is provided outside of the atomizer assembly, a battery assembly protective cartridge is provided outside of the battery assembly, the atomizer assembly protective cartridge is connected to the battery assembly protective cartridge via a holder, and an atomizing seat fitted with the holder is provided at an inner end of the atomizer assembly; and the atomizer assembly protective cartridge, the holder and the battery assembly protective cartridge are connected by a coating layer which is provided outside of the atomizer assembly protective cartridge, the holder and the battery assembly protective cartridge;

wherein an end, fitted with the atomizing seat, of the holder is provided with an inner plug-in section;

an end, fitted with the holder, of the atomizing seat is provided with an outer socket section;

the holder is fixed to the atomizing seat by inserting the inner plug-in section into the outer socket section; and there is interference fit between the atomizer assembly protective cartridge and the outer socket section, as well as between the battery assembly protective cartridge and the outer socket section.

2. The electronic cigarette according to claim 1, wherein an air intake communicating with external environment is provided in the holder.

3. The electronic cigarette according to claim 1, wherein a first air hole communicating with the air intake is provided in the battery assembly protective cartridge or the atomizer assembly protective cartridge; and a second air hole communicating with an air intake is provided in the coating layer.

4. The electronic cigarette according to claim 1, wherein an air inlet communicating with external environment is provided in an outer end of the battery assembly protective cartridge.

5. The electronic cigarette according to claim 1, wherein the atomizer assembly protective cartridge and the battery assembly protective cartridge are made of any one of the following materials: silicone, rubber, thermoplastic polyurethane, thermoplastic elastomer, thermoplastic rubber, amorphous polyethylene terephthalate, polyvinyl chloride, or polycarbonate.

6. The electronic cigarette according to claim 1, wherein the holder is made of any one of the following materials: silicone, rubber, thermoplastic polyurethane, thermoplastic elastomer, thermoplastic rubber, amorphous polyethylene terephthalate, polyvinyl chloride, or polycarbonate.

7. The electronic cigarette according to claim 1, wherein the coating layer is a paster.

* * * * *